United States Patent [19]

DuVall et al.

[11] Patent Number: 4,584,203
[45] Date of Patent: Apr. 22, 1986

[54] DOUGH ROLLING PROCESS FOR LAMINATED COOKIES

[75] Inventors: John G. DuVall, Fairfield; Charles E. Kirby; Suzanne L. Hardie, both of Cincinnati, all of Ohio

[73] Assignee: The Procter & Gamble Co., Cincinnati, Ohio

[21] Appl. No.: 579,836

[22] Filed: Feb. 21, 1984

Related U.S. Application Data

[63] Continuation-in-part of Ser. No. 475,771, Mar. 16, 1983, abandoned.

[51] Int. Cl.⁴ ............................................. A21D 8/00
[52] U.S. Cl. ................................... 426/549; 426/94; 426/502
[58] Field of Search ................. 426/94, 502, 560, 549

[56] References Cited

U.S. PATENT DOCUMENTS

| | | | |
|---|---|---|---|
| 776,731 | 12/1904 | Dietz | 425/332 |
| 802,061 | 10/1905 | Thomas | 425/332 |
| 978,440 | 12/1910 | Eggenhofer | 425/332 |
| 1,236,505 | 8/1917 | Van Houten | 425/332 |
| 1,355,129 | 10/1920 | Corby | 426/549 |
| 1,948,870 | 2/1934 | Pointon et al. | 425/332 |
| 1,970,336 | 8/1934 | Pointon et al. | 426/502 |
| 2,975,059 | 3/1961 | Andrews | 426/555 |
| 3,026,205 | 3/1962 | Stone | 426/20 |
| 3,198,637 | 8/1965 | Harris et al. | 426/94 |
| 3,219,456 | 11/1965 | Matz et al. | 426/94 |
| 3,225,714 | 12/1965 | Gaskell | 425/454 |
| 3,250,625 | 5/1966 | Thelen | 426/94 |
| 3,250,626 | 5/1966 | Thelen | 426/94 |
| 3,689,280 | 9/1972 | Werner | 426/94 |
| 3,851,084 | 7/1972 | Rossen et al. | 426/502 |
| 3,917,856 | 11/1975 | Wong et al. | 426/94 |
| 4,137,336 | 1/1979 | Radlove | 426/555 |
| 4,155,691 | 5/1979 | Ridgeway et al. | 425/140 |
| 4,291,065 | 9/1981 | Zobel | 426/549 |
| 4,374,862 | 2/1983 | Hong et al. | 426/94 |
| 4,455,333 | 6/1984 | Hong et al. | 426/94 |

FOREIGN PATENT DOCUMENTS

| 2414177 | 9/1915 | Fed. Rep. of Germany . |
| 2511847 | 9/1976 | Fed. Rep. of Germany . |
| 2073647 | 10/1981 | United Kingdom . |

OTHER PUBLICATIONS

Matz, Bakery Technology and Engineering, 2nd Ed., Westport, Conn., AVI Pub. Co. Inc., 1972, pp. 204-205, 354-355.

Redfern and Hickenbottom, "Levulose-Containing Corn Syrups for the Baker", The Bakers Digest, Apr. 1972, pp. 26-31.

Cannon, M., The Fructose Cookbook, Fast & McMillan Publishers, Inc., Charlotte, N.C., pp. 101-112 (1979).

Manley, D. J. R., Technology of Biscuits, Crackers & Cookies, Ellis Horwood Limited, Chichester, England, pp. 269-306 (1983).

*Primary Examiner*—Raymond Jones
*Assistant Examiner*—Elizabeth A. King
*Attorney, Agent, or Firm*—Nancy S. Mayer; Edmund F. Gebhardt; Richard C. Witte

[57] ABSTRACT

A process for making cookies intended to simulate typical drop cookies from a plurality of laminated doughs, wherein the appearance and quality of the cookies is desirably improved by rolling the cut laminate preforms prior to baking to prevent any formation of thin, crisp edges upon baking, and to control the visibility of morsels such as flavored chips.

32 Claims, 12 Drawing Figures

DOUGH ROLLING PROCESS FOR LAMINATED COOKIES

This is a continuation-in-part of the prior copending patent application Ser. No. 475,771, filed Mar. 16, 1983 now abandoned.

TECHNICAL FIELD

This invention relates to a process for making simulated drop cookies from a plurality of laminated doughs, wherein the appearance and quality of the cookies is desirably improved by rolling the cut laminate preforms prior to baking to eliminate the formation of thin, crisp edges upon baking, and to control the visibility of morsels such as flavored chips.

BACKGROUND OF THE INVENTION

Drop cookies can be made using a rotary molder. The rotary molder provides a drum or belt having cavities of the shape desired for the cookie to be baked. At one point in the motion of the belt or drum, these cavities are filled with cookie dough of the desired formulation. Further travel of the belt or drum of the rotary molder then transfers the dough in the filled cavities to a moving belt or band in contact with one in close proximity to it. Preferential adherence of the dough to the belt or band causes the dough deposited in the rotary molder cavities to be transferred to the belt or band, by which they are transported through a continuous oven for baking.

In the manufacture of other cookies, dough is deposited directly on the belt or band by extrusion of discrete deposits of dough via extrusion dies of the desired shape. Still other cookies are made by co-extrusion processes, by forming a sheet of dough from which is cut the desired shapes, and, finally, by lamination of already baked cookie portions with fillings, icings, marshmallow creme, and the like.

A variety of equipment is available to perform dough forming and handling during manufacturing processes. For example, U.S. Pat. No. 1,948,870, issued Feb. 27, 1934, and U.S. Pat. No. 1,970,336, issued Aug. 14, 1934, both to Pointon and Harber and assigned to Baker Perkins Co., Inc., are directed to dough forming apparatus comprising open top cups or rings which move in an orbital path to form a dough piece which is confined therein. A stated objective is to mold the dough pieces into ball or sphere-like formation by the employment of a row of molding cups or rings, which are given orbital balling movements of variable amplitude about the axis of each cup. A support surface for the dough pieces is positioned opposite the molding rings and can be periodically advanced stepwise so that dough pieces rolled by one row of cups or rings are in position for treatment by the next row of cups or rings.

U.S. Pat. No. 3,225,714, issued Dec. 28, 1965 to Gaskell, discloses improved moulding rings and closed top cups for use in forming dough products. The cups appear to be intended for use on apparatus of the type generally disclosed in the Pointon et al. patents. The cups are provided with dough-working ribs having a substantial axial directional component to provide undulations which are so shaped as to knead or work a dough piece as the cups are moved in a gyratory motion. The gyratory movement and internal taper of the cup urges the dough downwardly onto the conveyor so as to assure its effective molding adhesion thereto, while the ribs on the interior of the cup work over the external surface of the dough, leaving air spaces between the dough and the ribs, which reduce any tendency of the dough to stick to the mold. A multiple cup unit for carrying a plurality of detachable cups of various sizes is also described.

While it is clear from the foregoing and other, similar references that methods and apparatus for rolling pieces of dough-like product are known in the art, it is significant that none of the foregoing references are directed to the rolling of laminated dough pieces wherein the objective is to simulate drop cookies, such as made by the rotary molder technique. It is also significant that none of the foregoing references are directed to multilayer products, wherein the objective is to provide substantially uniform encapsulation of an inner portion of dough within a distinct outer layer of dough. In addition, none of the foregoing references disclose rolling of multi-layered doughs to control the appearance of flavored chips or other morsels in the baked product.

Europen patent application No. 31,718, Hong and Brabbs, filed Dec. 23, 1980 and published July 8, 1981, which is herein incorporated by reference, describes the manufacture of laminated cookies which combine different doughs to produce a product whose long-term texture mimics that of freshly baked cookies. The cookies are made from laminated dough structures formed by a variety of techniques. These techniques include (1) enveloping an inner dough within a layer of a second outer dough by hand crimping discs of outer dough around a ball of inner dough, (2) layering sheets of two or more alternating doughs previously cut to the appropriate size, (3) layering large sheets of two or more alternating doughs and then cutting into pieces, (4) laminating one or more doughs onto the top of, or a portion of the top of, a distinct dough, (5) embedding particles of one or more doughs into a distinct dough (6) winding strands of one or more doughs onto the surface of a ball of a distinct dough, (7) laminating alternating sheets of two or more doughs, rolling, and slicing, or (8) co-extruding two or more doughs on a Rheon ® encrusting machine, by which inner and outer doughs are co-extruded simultaneously and concentrically by the machine, and the outer dough wraps around the inner dough and is formed by an encrusting disk into a ball which is then baked.

It has now been determined that for some of the above laminating techniques, rolling of the dough pieces prior to baking results in cookies of improved appearance and quality. Rolling of the dough pieces prior to baking is essential for any laminating technique where the dough is not formed into the shape of a ball. The latter includes, for example, co-extrusion of the doughs in a continuous form which when cut yields rectangular segments or other shapes not spherical or hemispherical in form, a sheet/deposit/sheet/cut process wherein a first layer of dough is formed into a sheet upon which inner dough pieces are deposited and covered with a second sheet of the first or a third dough, and cut to a shape not spherical or hemispherical in form, and other equivalent processes which generate a dough piece which is not round, hemispherical, or spherical in shape.

It has now been determined that cookies of the Hong and Brabbs type made from processes generating dough pieces which are not round or spherical in shape have different baking dynamics from cookies of the Hong and Brabbs type made from rounded doughballs. The product resulting from these processes can have thinner, crisper edges than a typical drop cookie, or a cookie made by a rotary molder having hemispherical cavities. This is due to the requirement of a finite amount of perimeter space needed to seal the upper and lower dough sheets or outer dough around the inner dough. A lack of inner dough at the edges where the upper and lower dough sheets meet and seal can result in the formation of thin, crisp edges during baking which are often darker in color. Likewise, a lack of inner dough in the corners of dough pieces of rectangular or other geometric shapes yields the same undesirable result. These thin, crisp edges contribute to product breakage and reduced consumer acceptance. At the same time, use of laminating processes can result in decreased visibility on the surface of the finished product of chips or morsels contained in the inner dough. This also contributes to reduced consumer acceptance.

Accordingly, it is an object of this invention to prevent the formation of undesirable crisp, thin edges on laminated cookies made from dough pieces not rounded, hemispherical, or spherical in shape.

It is a further object of this invention to provide substantially spherical or substantially hemispherical laminated dough pieces made by extrusion, co-extrusion, sheet/deposit/sheet/cut, or other equivalent methods.

It is a further object of this invention to provide a process for rolling dough which provides substantially uniform encapsulation of an inner piece of dough within a distinct outer layer of dough.

It is a further object of this invention to provide a process for rolling dough which controls the degree of visibility of flavored chips or other morsels in the baked product.

These and other objectives of the invention will be evident from the following disclosure:

DISCLOSURE OF THE INVENTION

This invention provides a process for making an improved crumb-continuous cookie having distributed therein discrete regions of storage-stable crisp texture and discrete regions of storage-stable chewy texture from a plurality of cookie doughs, comprising the steps of:

(a) forming a laminate cookie preform from the doughs;
(b) rolling the preform; and
(c) baking the rolled preform.

The laminated cookie preforms are rolled into a substantially spherical or substantially hemispherical shape to provide essentially uniform encapsulation of the individual pieces of at least one inner dough within at least one distinct outer layer of dough. This prevents the formation of crisp edges on the cookies during baking and results in more uniform color and resistnce to breakage. The rolling step also reduces the need for complex formulation changes to control dough spread for various oven types and baking conditions. The rolling step also controls the exposure and visibility of any flavored chips or other morsels.

Preferably, the dough preforms are rolled employing an orbiting cup device comprising:

(1) a platen having one or more rows of one or more cup or cavity units;
(2) a mechanical arm connected pivotally to the platen;
(3) a base support rotatably connected to the mechanical arm;
(4) means for moving the platen vertically and horizontally simultaneously; and
(5) means for rotating the platen in a circular orbital motion while simultaneously moving horizontally parallel to a continuously moving conveyor belt supporting the dough pieces.

The size of the cup or cavity unit relative to the dough piece is such that the outer top surface of the dough is smeared by the cup to control visibility or exposure of morsels such as flavored chips, nuts, and the like. Each dough piece is rolled only by a single cup or cavity unit. Preferably, a plurality of dough pieces are simultaneously rolled once by the platen which provides correct alignment of the pieces on the continuously moving conveyor belt to accommodate reasonable variation in dough spread during baking such that contact of individual baked cookies is prevented.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in connection with the accompanying drawings in which:

Like numbers of reference in the several figures indicate the same items or components.

DESCRIPTION OF THE PREFERRED EMBODIMENTS

Figure 1:
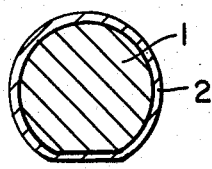
FIG. 1 is a cross-sectional elevation of a co-extruded, substantially spherical dough piece for a laminated cookie of the Hong and Brabbs type.
Figure 2:
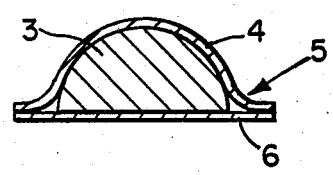
FIG. 2 is a cross-sectional elevation of a dough piece made by a sheet/deposit/sheet/cut process for a laminated cookie of the Hong and Brabbs type.

Dough preforms for laminated cookies of the Hong and Brabbs type are distinct in shape depending upon the method of formation. Examples of distinct shapes are shown in FIGS. 1 and 2 of the drawings. FIG. 1 is a cross section of a co-extruded dough preform which is substantially spherical in form, resembling a dough piece made using a rotary molder. Inner dough 1 is uniformly encapsulated within a distinct layer of discrete outer dough 2. FIG. 2 is a cross section of a dough preform made by a sheet/deposit/sheet/cut process. Inner dough or filling 3 is not uniformly encapsulated by outer doughs 4 and 6. The preform is not spherical but instead has an overlapping of the bottom and top dough sheets, 4 and 6, around the perimeter. This overlapping area 5 forms a seal to enclose inner dough deposit 3.

The distinct shapes of the dough preforms result in different flow dynamics during baking. When the spherical dough piece of FIG. 1 is baked it spreads via a "roll" type flow, as denoted by the arrows in FIG. 1A. Dough near the diameter of the sphere rolls downward onto the baking surface. When the dough piece of FIG. 2 is baked it spreads via a "slide" type flow, as illustrated by the arrows in FIG. 2A. The weight of the center deposit exerts a downward force pushing the perimeter seal of bottom and top doughs outward. Thus, the difference in baking dynamics of the two dough shapes provides baked cookies of distinct shapes.

Figure 1A:
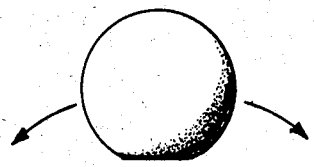
FIG. 1A is a side elevation view of a co-extruded, substantially spherical dough piece for a laminated cookie of the Hong and Brabbs type.
Figure 2A:
FIG. 2A is a side elevation view of a dough piece made by a sheet/deposit/sheet/cut process for a laminated cookie of the Hong and Brabbs type.
Figure 1B:
FIG. 1B is a side elevation view of a baked laminated cookie of the dough piece of FIG. 1A.
Figure 2B:
FIG. 2B is a side elevation view of a baked laminated cookie of the dough piece made by the sheet/deposit/sheet/cut process of FIG. 2A.

FIG. 1B is a cross section of a baked laminated cookie of the substantially spherical, co-extruded dough piece of FIG. 1A. The rolled outer edges result from the "roll" type flow of dough during baking. FIG. 2B is a cross section of a baked laminated cookie of the dough piece of FIG. 2A made by a sheet/deposit/sheet/cut process. Thin crisp edges, denoted as 7, can occur at the cookie perimeter corresponding to the overlapping seal area 5 of outer doughs 4 and 6, as shown in FIG. 2. The thin edges are often darker in color than the remainder of the cookie and usually easily broken. The present invention provides a process for preparing baked cookies of the preferred type illustrated in FIG. 1B from a dough preform with the shape shown in FIG. 2A and from dough preforms with other shapes that are not rounded, hemispherical, or spherical.

Forming a Cookie Preform

The first step of the process of this invention is forming a cookie preform from multiple doughs. Laminated dough structures, denoted herein as cookie preforms, can be made from a variety of techniques within the skill of those in the food production art. Of particular interest herein are those processes which generate a dough structure which is not rounded, hemispherical, or spherical in shape but instead has edges, corners, and the like. Examples of two such processes for the first step of this invention will be described. One is a sheet/deposit/sheet/cut process and the other a co-extrusion process.

A. Sheet/Deposit/Sheet/Cut Process

Forming a sheet of a first cookie dough by appropriate means is required. Sugar, flour, water, and shortening, when combined in almost any reasonable proportions, will produce a dough that can be baked to form a cookie. In general, any cookie formulation which produces an organoleptically acceptable cookie can be employed in the practice of this invention. Those skilled in the art are familiar with formula variations for controlling the rheology of the dough to render it suitable for specific manufacturing techniques, such as sheeting, rotary molding, extrusion, and other commercial treatments. The formulations employed in the present invention may also be optimized to provide a dough rheology consistent with minimizing the formation of thin crisp edges in the baked product.

The dough can be rolled into a sheet by hand by using a conventional rolling pin. Alternatively, a dough mass can be passed through a plurality of smooth parallel sheeting rolls to provide a smooth coherent workable dough sheet. As the dough sheet passes off the last roll in the series the dough is removed by a doctor blade angularly disposed with respect to the surface of the last sheeting roll. Doctoring angles up to about 180° (the maximum theoretical value) are preferably used. Two roll mills, three roll mills, four roll mills, etc. can be used. When roll milling is employed, differential roll speeds with a faster roll revolving from at least 1% to 20% and preferably at least 3% faster than the slowest roll are used. This is true because it has been found that where differential roll speeds with a faster roll traveling at least 1%, and preferably 3% greater speed than the slower roll are employed, the sheet will conveniently be fed to the faster moving roll. Roll gap can be adjusted to provide a sheet of the desired thickness. As the sheet is doctored from the final roll in the series, it is preferably transferred directly to a continuous band or belt for further processing.

Preferably the dough is extruded under pressure through a wide extrusion die of dimensions which will give the extruded sheet the desired thickness and width. The same extrusion process is used for forming the sheet of third cookie dough for appropriate placement. The sheets are extruded onto a continuously moving belt or band, which carries the extruded sheet to the next processing step. The sheets are preferably wide enough to substantially cover the manufacturing oven band and are from about 1 to about 3 mm. thick.

Next, a second cookie dough or filling is deposited on the sheet of first cookie dough. This is conveniently accomplished by use of a standard rotary molder in the usual way. Deposits of dough in the cavities of the rotary molder adhere to the tangentially moving belt at the point of contact with the rotary molder, and are transferred to the continuously moving sheet of first dough.

Alternatively, deposits of second cookie dough or filling can be placed on the sheet of first dough by extrusion under pressure through one or more extrusion dies or tubes positioned over the sheet of first dough. In another embodiment of the process of this invention, the second dough can be formed into individual pieces, which can then be placed directly on the sheet of first dough. In yet another embodiment of the process of this invention, the second dough can be deposited on the sheet of first dough in the form of a second sheet, using the process means employed for forming the sheets of first and third doughs.

It is preferable in the practice of this invention to have individual discrete deposits of second dough which are substantially hemispherical, or substantially spherical in shape. Clearly, spherical pieces of second dough can be used only when the pieces are formed separately prior to being deposited upon the sheet of first dough. However, when rotary molding or extrusion is used, substantially hemispherical second dough pieces can be used. The substantially hemispherical or substantially spherical shape of the second dough pieces facilitates the later steps of the process in providing a preferred dough shape around which the sheets of first and third dough can be formed during the rolling step.

Then a sheet of a third cookie dough is formed and placed on top of the deposits of second cookie dough. The dough can be extruded under pressure through a wide extrusion die or passed through a plurality of smooth parallel sheeting rolls as in the first step of the process.

The layered doughs are then cut into cookie preforms. Preferably, this is accomplished by a cutting mechanism which partitions the layered doughs into discrete pieces in accordance with the deposits of the second dough. Thus, only the first and third doughs are cut, around the individual pieces of second dough. Tamping the top dough sheet with a roller prior to cutting aids in molding it around the deposits of the second dough. A continuous cutting mechanism which moves synchronous to the dough sheets transported by the moving belt or band can easily generate the desired cookie preforms. Precise cutting of the composite dough pieces is not critical to appearance because the cut pieces are reshaped during the rolling step of the process. Preferably, the cutting mechanism cuts the doughs and simultaneously crimps the edges of the upper and lower doughs to seal the deposited dough within, with no damage to the conveyor belt or band.

The preforms can be cut into any desired shape, such as circular, square, rectangular, etc. The preferred shape is a hexagon or similar shape which closely resembles a circle but results in no generation of waste pieces of dough when cutting multiple preforms concurrently.

In another embodiment of this process the cutting can occur prior to layering, or assembling, of the doughs. The first and third doughs can be sheeted and cut into the desired shapes followed by insertion of the deposit of second dough between one piece of each of the first and third doughs to form a cookie preform. The cutting may also occur during dough layering. The first dough may be cut after deposit of the second dough thereon, followed by layering with a sheet or individual precut pieces of the third dough. Alternatively, the first dough may be cut prior to deposit of the second dough thereon, followed by deposit of the second dough, and by layering with a sheet or individual precut pieces of the third dough. A second cutting would be required in these alternatives if the third dough is in sheet form. Preferably, the dough sheets are cut simultaneously in one cutting step after layering of the doughs.

B. Co-extrusion Process

An alternative process of the present invention for forming a cookie preform of multiple doughs is to use a co-extrusion process. Preferably, two or more distinct doughs are continuously extruded from separate hoppers as concentric cylinders. A cylindrical-shaped solid core of inner dough is surrounded by one or more layers of cylindrical-shaped rings of distinct outer dough. The continuous cylinder is then cut into pieces to form dough preforms.

Any suitable extrusion equipment can be employed. Typically the extruder comprises two or more hoppers with feed rolls to channel the flow of dough through a number of tubes called die cups or through extrusion nozzles. These can have orifices of any desired shape. Dough can be fed to the hoppers manually or mechanically by pumps or other suitable means. As an alternative to multiple distinct hoppers, separator plates can be inserted into a single large hopper. Feeding the dough at a steady rate is important to assure constant extrusion. Usually two or three feed rolls are used and the distance of separation of the rolls is commonly adjustable. Action of the feed rolls can be continuous or intermittent. Roll speed should be such that the dough is not overheated through excess friction. A change in the speed of one feed roll usually results in a corresponding change in the speed of the others. The dough is fed through an extrusion nozzle that has an orifice of any of several desired shapes onto a conveyor belt. As previously stated, it is preferred that the doughs be formed into continuous concentric cylinders.

The continuous cylinder of doughs is then cut into individual dough preforms. Preferably the dough is cut in a manner such that the outer dough layer is smeared across the inner dough which would be exposed by the cutting process to encapsulate or substantially enrobe the inner dough piece within a layer of outer dough. When sufficient cutting pressure is used to achieve the desired smearing the resulting dough piece is often distorted in shape. A shape like a rectangular pillow having four corner edges, comprised only of outer dough, can result.

Rolling

Following assembly, the cookie preform is repositioned and rolled. Preferably, it is rolled into a substantially hemispherical or substantially spherical shape. This removes any edges or corners formed during cutting and provides a layer of outer dough or doughs substantially uniformly enrobing the deposited inner dough. The crimped edges of the first and third doughs formed upon cutting during the sheet/deposit/sheet/cut process are eliminated. Any corners resulting from cutting co-extruded dough cylinders are likewise eliminated. The preferred hemispherical or spherical shapes, when baked, provide the desired "roll" type flow dynamics as the cookie spreads. This reduces the need for complex formulation changes to control dough spread for various oven types and baking conditions. The resulting rounded edges in the baked cookies are more uniform in color and more resistant to breakage then the thin crisp edges or corners of cookies which can result without the rolling step.

In a laminated dough product containing flavored chips, raisins, nuts, fruit bits, coconut, cereals, or other edible morsels in the inner dough, the rolling step controls the degree of visibility of the morsels and helps randomize their distribution. Precession of the axis of each individual dough preform results from rolling and randomizes the distribution of morsels thereby improving the appearance of the baked cookie. For example, dough preforms that are cut from co-extruded concentric cylinders of doughs usually have morsels exposed approximately 180° apart at the points where the doughs were cut. If baked without rolling these dough preforms will result in cookies having at least two exposed morsels at the edges about 180° apart when viewed from the top. Rolling the dough preforms causes the axis of each to precess and reorients morsel distribution. The chips exposed by the cutting step that are about 180° apart usually are reoriented in a manner such that only one appears at the top surface of the baked cookie, and the other is at the bottom surface. Cookies baked from the rolled dough preforms are improved in appearance due to a random morsel distribution.

The rolling device, after rendering the enrobed inner dough in a more uniform layer of distinct outer dough can also smear the top surface of the outer dough to partially expose or increase the visibility of the morsels in the inner dough. The morsels become visible through the outer dough. Dough balls having a smeared top surface of the outer layer upon baking generate cookies with a greater level of appearance of morsels on the surface. The desired degree of smearing of the top surface of the outer dough can be achieved by regulating the viscosities of the inner and outer doughs through formulation, mixing procedures, temperature, and thickness. Alternatively, the morsels can be sprinkled onto the cookie preform just prior to rolling. The rolling step will then cause the morsels to penetrate into the outer dough layer as it rolls the dough preform. The techniques can be combined if it is desired to have morsels in both inner and outer doughs.

Any of the art disclosed equipment for rolling dough pieces to substantially hemispherical or substantially spherical shape can be modified for use in the rolling step of this invention. Alternatively, the dough can be rolled by hand. In a preferred mode, an orbiting cup device as depicted in FIGS. 5 through 8 is employed.

Figure 3:
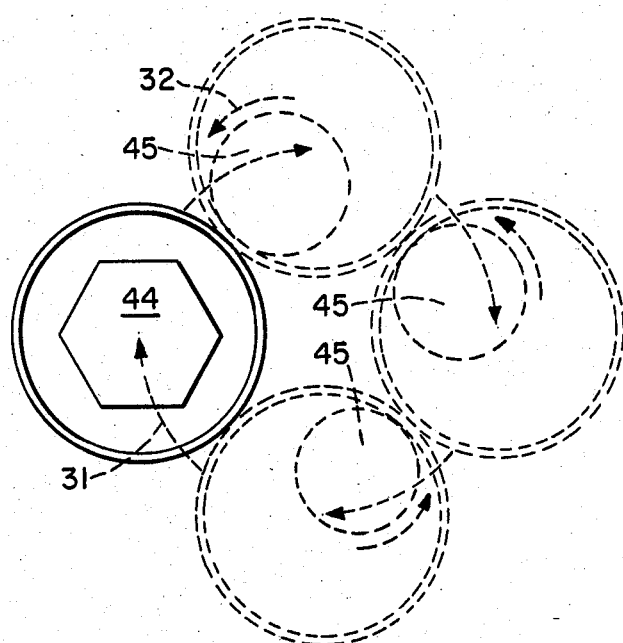
FIG. 3 is a simplified bottom plan view of a single cup unit of an orbiting cup device showing the rolling of a cut laminated dough piece.
Figure 4:
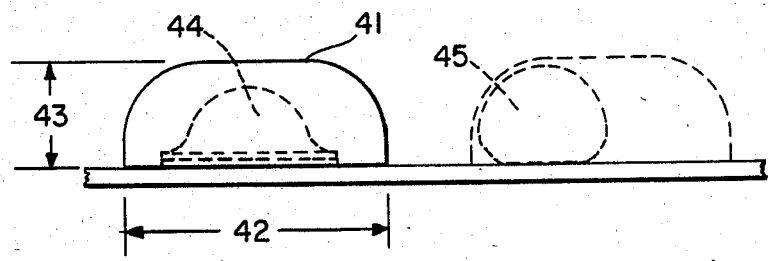
FIG. 4 is a simplified side elevation view of the single cup unit shown in FIG. 3.

The operation of a single cavity or cup unit of the preferred orbiting cup device shown in FIGS. 3 and 4. The dough-shaping cup is represented by 41. It has an external diameter 42 and a height 43. The initial position of the cookie preform within the cup is represented by 44. It's position during rolling is represented by 45. The cup is orbited in a circular motion in the direction indicated by arrow 31, thereby rolling the dough piece. The cup can also rotate counterclockwise. The dough piece rotates within the cup in the direction indicated by arrow 32.

Each individual cup or cavity unit, which itself does not revolve, rolls the dough preform around against the interior unit surface, forming it into a substantially hemispherical to substantially spherical shape. The force of the orbiting motion reduces the diameter of the dough preform, resulting in an increase in the preforms height. This growth is restricted by the top of the cavity. The periphery and top of the cavity form the product into the desired shape and smear its top layer. The pre-ordained pattern of movement can be controlled by any of several suitable means. Preferred is control by computer. Arresting the orbiting motion at a predetermined position provides correct placement of the preform on a discharge belt for further processing.

The degree of visibility of morsels contained in the inner dough achieved by smearing the top surface of the outer dough layer is dependent upon the depth of the orbiting cup or cavity relative to the size of the cookie preform, the number of orbits or rotations made by the unit, the orbiter speed, and the cup or cavity interior shape and finish. A variation of 0.10 inch (0.25 cm.) in unit depth produces visible results. Shallow cups or cavities have a tendency to tear open the top dough layer, while those too deep leave the top layer untouched and morsels covered. For example, it has been found that a cup or cavity depth of about 0.75 inch (1.9 cm.) is preferred with dough pieces of about 0.6 inch (1.5 cm.) in height. The number of orbits of the cup or cavity to achieve the desired level of morsel visibility is dependent upon ambient temperature and humidity, and viscosity of the dough. Dough viscosity can be controlled through formulation and temperature.

Orbiter speed and cup or cavity shape and finish also affect the appearance of the final product by changing the level of work input into the dough piece. Orbiter speeds can range from about 10 to about 200 rpm (revolutions per minute). A speed of about 60 to about 120 rpm is preferred. Lower speeds require a greater number of orbits, while high speeds can result in oval or parallelogram-shaped dough pieces instead of the preferred spherical or hemispherical. The orbit of the preform does not coincide with the orbit of the cup or cavity, but is of a smaller radius and is a function of the inside diameter of the unit as shown in FIG. 3. Ovals, parallelograms, and other undesirable shaped can also be generated by cup shape and finish. A very smooth surface finish on the inside of the cup or cavity can result in misshapen rolled preforms at high orbiter speeds dependent upon dough rheology. A somewhat rough finish is preferable. Suitable interior materials include Celcon ®, Plexiglass ®, and the like. Any of several cup or cavity interior and exterior shapes can be employed. In general, a hemispherical interior with a circular edge is preferred.

Figure 6:
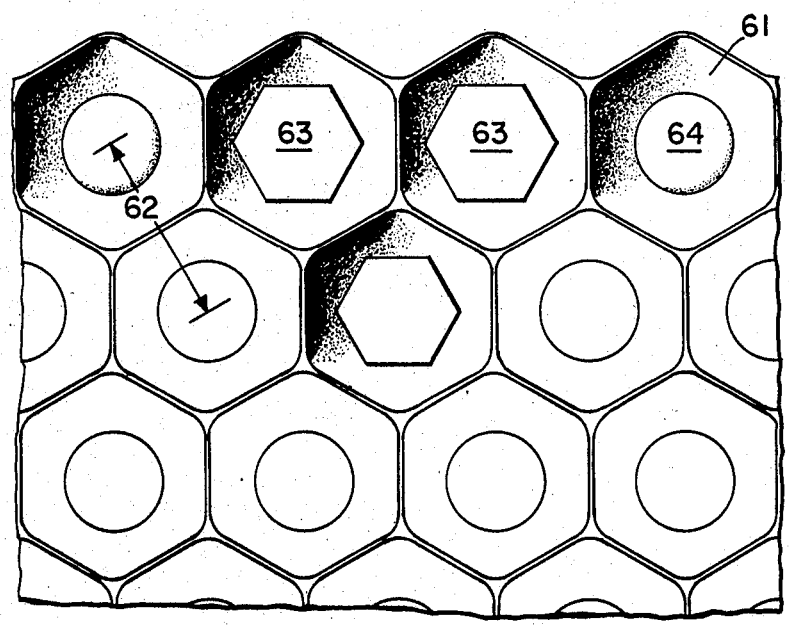
FIG. 6 is a fragmentary bottom plan view of a portion of a platen of multiple cavities of an orbiting cup device showing the cavity interior and the position of the dough piece to be reshaped.

Preferably, several cup or cavity units are operated simultaneously. FIG. 6 illustrates a portion of a multi-unit platen. The platen can be comprised of one or more single cup units or may be a solid plate containing one or more cavities. The individual units do not revolve independently about their individual axes. The platen of FIG. 6 is viewed looking into the cup or cavity interiors, showing the adjacent location of the individual cavities. An individual cavity is denoted as 61. The edges of the cavities are preferably circular in shape but can be a multi-sided configuration similar to a circle such as hexagonal. This minimizes space between cavities, permits adjacent nesting of units, and minimizes the possibility of dough being between the cavities or cups. When the cavity edges are hexagonal or multi-sided, they transition to a rounded hemispherical shape, and any corners present are rounded. The interior cup shape is one factor that affects control of the visibility of chips or morsels in the inner dough via smearing of the outer dough layer. The interior cup shape also affects precession of the axis of the dough piece during rolling. The distance 62 between unit centers is designed to accommodate a reasonable variation in dough spread during baking. The preferred orientation 63 of the hexagon-shaped dough preform within the individual cavity or cup unit is not crucial. A flat circular area 64 can occur at the apex of each unit. A unit with a hemispherical interior with a circular edge results in greater visibility of chips through increased smearing of the top surface of the outer dough layer than is achieved by one that is hexagonal on the edge which transitions to a substantially hemispherical shape. The former decreases tearing or shredding of the dough. The outside of the units can be hemispherical, hexagonal or other similar shapes and can be distinct in shape from the interior.

Figure 5:
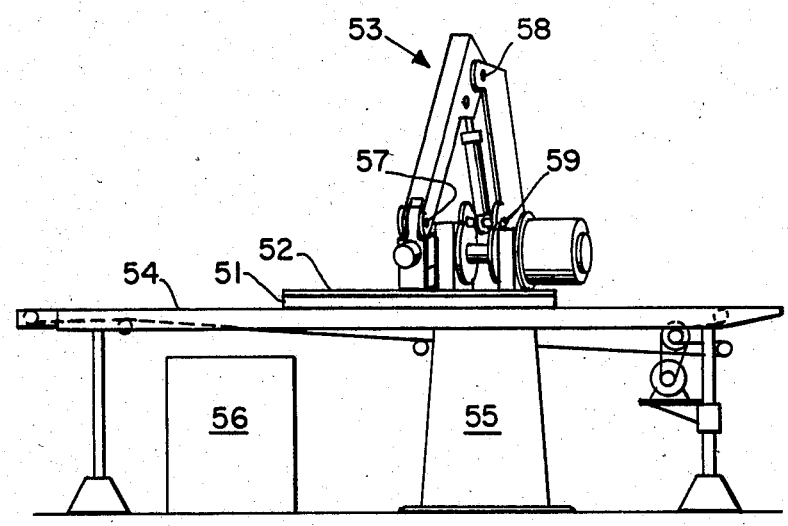
FIG. 5 is a simplified fragmentary elevation view of an orbiting cup device for rolling cut laminated dough pieces.
Figure 7:
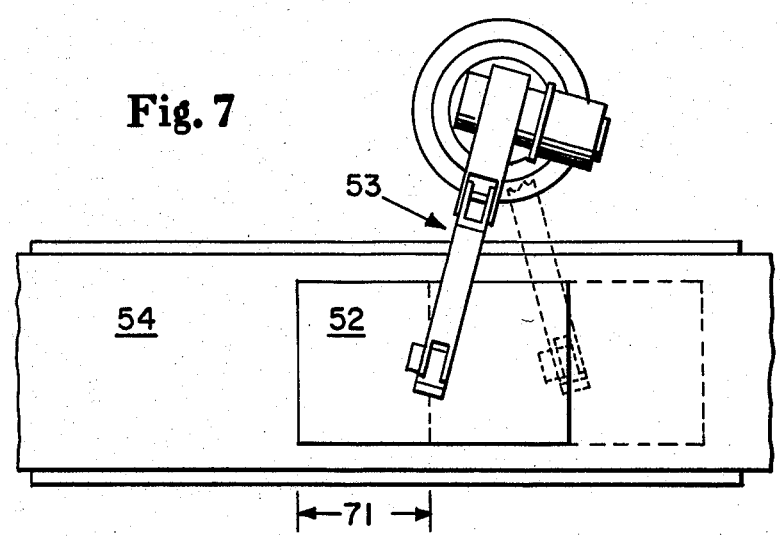
FIG. 7 is a simplified fragmentary top plan view of the orbiting cup device shown in FIG. 5 for rolling cut laminated dough pieces.
Figure 8:
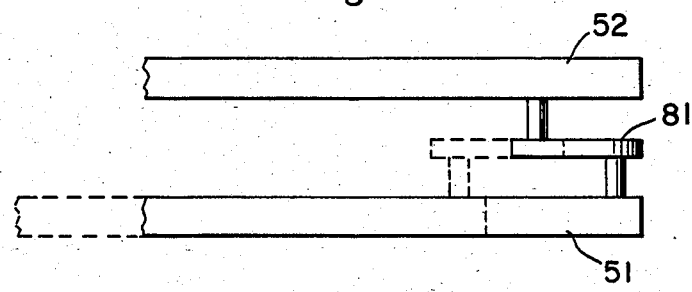
FIG. 8 is a schematic fragmentary side elevation view of a crank device pivotally connecting platen 51 and platen 52 of FIG. 5 showing the orbiting motion of platen 51.

As illustrated by FIGS. 5 and 7, a large platen 51 having one or more rows of one or more cup units or cavities, is lowered by mechanical arm 53 over one or more dough preforms supported by moving belt 54 such that each individual dough preform is covered by one individual cavity or cup unit. Platen 51 is then rotated in a circular orbital motion while simultaneously continuously moving horizontally a distance 71 in the form of a flat spiral thereby rolling the dough pieces. Platen 51 is orbited by means of a crank-type mechanism illustrated in FIG. 8. It is pivotally connected to platen 51 and to a distinct platen 52. Platen 52 is connected pivotally to mechanical arm 53 and does not orbit. Platens 51 and 52 move horizontally in the direction of movement of the conveyor belt a distance 71, are elevated slightly to clear the dough pieces, move horizontally in the opposite direction a distance 71, and are lowered over different dough pieces to repeat a continuous cycle. Platen 51 does not have to be in direct contact with the belt transporting the dough pieces to effectively roll the cookie preforms, but is preferably raised slightly above the belt surface. However, this gap should be minimized to avoid extruding dough into the gap. Platen 52 can be any number of distinct shapes such as a rectangular plate, a framework of arms, or other equivalent connecting means between mechanical arm 53 and orbiting platen 51.

The motion of platens 51 and 52 and mechanical arm 53 is controlled by computer 56. The number of orbits can be varied within a fixed stroke distance or, alternatively, the stroke distance can be varied according to the number of orbits. The number of orbits per stroke and the stroke distance are adjusted for the specific product depending upon the viscosity or rheology of the dough, level of work input into the dough desired, and degree of chip visibility and randomization desired. At the completion of each stroke, the orbiting motion is arrested at a predetermined position which provides correct placement of the dough preforms on belt 54 for further processing. Platens 51 and 52, which move continuously, are then raised above the dough pieces and returned to the initial stroke position to begin a new cycle. The orbital motion can be reversed during the return stroke. The belt supporting the dough preforms continuously advances during operation of the orbiting cup device.

Base support 55 is rotatably connected to mechanical arm 53. Mechanical arm 53 is preferably jointed at points 57, 58 and 59 in order to move platens 51 and 52 horizontally and vertically simultaneously during the working cycle. The platens can be transferred between conveyor belts and positioned for easy cleaning and maintenance.

The foregoing illustrates one preferred mode of practicing the rolling step of this invention.

Baking

The final step of the process of this invention is baking of the cookie preforms. Baking conditions will vary over a considerable range dependent upon the dough compositions, equipment utilized, and desired characteristics in the final product.

Summary

It can be appreciated that still other embodiments or executions, from an apparatus standpoint, of this invention can be devised without departing from its scope and spirit and without losing its advantages. In particular, the rolling process, however practiced, results in different flow dynamics during baking, which reduces the complexity of formulation required in attempting to control dough spread during baking. In addition, precise cutting or forming of composite dough pieces becomes less critical for making cookies with good appearance, since the pieces are reshaped during the rolling process. The resulting rounded edges in the baked cookies show more uniform color and are more resistant to breakage than the thin, crisp edges which can occur on cookies made directly from unrolled preforms. Also for a product containing flavored chips or other morsels, the appearance of the morsels in the baked cookie can be controlled.

Industrial Applicability

The following embodiments illustrate the practice of this invention, but are not intended to limit it. CL EXAMPLE 1

| Ingredients | Percent by Weight |
| --- | --- |
| First Dough | |
| Hydrogenated vegetable shortening | 16.5 |
| Sugar | 31.1 |
| High fructose corn syrup | 5.1 |
| Flour | 37.4 |
| Flavor and minor ingredients | 1.0 |
| Water | 8.9 |
| Second Dough | |
| Hydrogenated vegetable shortening | 15.5 |
| Sugar | 9.5 |
| High fructose corn syrup | 26.4 |
| Flour | 24.6 |
| Flavoring and minor ingredients | 3.7 |
| Chocolate chips | 20.3 |
| Third Dough | |
| Hydrogenated vegetable shortening | 16.5 |
| Sugar | 31.1 |
| High fructose corn syrup | 5.1 |
| Flour | 37.4 |
| Flavor & minor ingredients | 1.0 |
| Water | 8.9 |

The first dough was formed by mixing the ingredients in the following order: the high fructose corn syrup, water, and liquid flavor ingredients were mixed, then the shortening added and the mixture creamed. The sugar was then added, mixing continued, and then the flour and other minor dry ingredients were added.

The second dough was prepared by mixing the water and liquid flavoring material with the high fructose corn syrup. The shortening was then added and the mixture creamed until the shortening began to crystallize. The sugar was then added, and the mixture is creamed again. All the dry ingredients were then mixed in.

The third dough was prepared in the same manner as the first dough.

The first dough was rolled to a sheet 1-2 mm. in thickness. About 10 grams of the second dough was formed into a ball (substantially spherical) which was placed on top of the first dough. The third dough was then rolled to a 1-2 mm. sheet and placed on top of the ball of second dough. The sheets of dough were then cut in a hexagon shape about 4 cm. in diameter around the deposits of the second dough. The edges of each were crimped manually to seal the ball of second dough between the hexagons of first and third doughs. One half of the resulting composite dough pieces were rolled by hand to yield a substantially spherical cookie preform. The remainder were baked as hexagon-shaped preforms. Upon baking at about 305° F. to 310° F. (152° C. to 154° C.) for about 8½ minutes, a roll type flow was obtained resulting in a cookie similar to a drop or rotary molded type cookie without atypical thin, crip edges for the rolled preforms. The rounded edges were uniform in color. The level of appearance and distribution of chocolate chips upon the surface of the baked cookies was acceptable. The cookie diameters averaged 2.36 inches (5.99 cm.). For the hexagon-shaped preforms a sliding type of flow was obtained resulting in cookies with thin crisp edges with variation of color in the edges. The appearance of chocolate chips on the surface of the baked cookie was minimal or nonexistent. The cookie diameters averaged 2.48 inches (6.30 cm.). The above process was repeated two additional times with similar results.

EXAMPLE 2

| Ingredients | Percent by Weight |
|---|---|
| First Dough | |
| Hydrogenated vegetable shortening | 16.7 |
| Sugar | 30.8 |
| High fructose corn syrup | 4.6 |
| Molasses (26 ± 4% invert sugar) | 1.5 |
| Baking Soda | 0.5 |
| Flour | 37.4 |
| Flavor and minor ingredients | 1.0 |
| Water | 7.5 |
| Second Dough | |
| Hydrogenated vegetable shortening | 15.5 |
| Sugar | 9.5 |
| High fructose corn syrup | 26.4 |
| Baking Soda | 0.5 |
| Flour | 24.2 |
| Flavor and minor ingredients | 3.6 |
| Chocolated chips | 20.3 |
| Third Dough | |
| Hydrogenated vegetable shortening | 16.7 |
| Sugar | 30.8 |
| High fructose corn syrup | 4.6 |
| Molasses (26 ± 4% invert sugar) | 1.5 |
| Baking soda | 0.5 |
| Flour | 37.4 |
| Flavor and minor ingredients | 1.0 |
| Water | 7.5 |

The first dough was formed in the following manner. The baking soda was dissolved in the water and combined with the flavor and molasses. The combination was mixed with the high fructose corn syrup. The shortening was added and the mixture creamed. Half of the sugar was mixed in, the flour and minor ingredients were added and mixed, and the remainder of the sugar added and mixed.

The second dough was prepared by first mixing the high fructose corn syrup, flavor, and baking soda. The shortening was added and the mixture creamed. Half of the sugar was mixed in, the flour and minor ingredients added and mixed, and the remainder of the sugar was added and mixed. Finally, the chocolate chips were mixed in.

The third dough was prepared in the same manner as the first dough.

The first dough was extruded into a sheet about 2–4 mm. in thickness onto a continuously moving belt. Discrete hemispherical deposits of the second dough of about 12.5 grams in weight were placed upon the sheet of first dough in an ordered pattern by means of a rotary molder. The third dough was extruded into a sheet about 2–4 mm. in thickness and placed over the lower sheet and deposits. The top sheet was tamped into place with a roller of about 6 inches in diameter. The dough sheets were cut around the deposits of second dough to yield multiple hexagon shaped cookie preforms. The preforms were then repositioned to provide proper alignment for rolling. The preforms were rolled to substantially hemispherical shape using an orbiting cup device as previously described. The second dough deposit was substantially uniformly encapsulated within an outer layer of the first and third doughs. An orbiting cup device having a platen of several cavity units, each having a hemispherical interior and hexagonal exterior, with a depth of 0.75 inch (1.9 cm.) rotating at about 105 rpm rolled several dough preforms simultaneously and smeared the top surface of the outer layer of dough to increase the visibility of or to expose the chocolate chips in the inner dough. Arresting the orbiting motion at a predetermined position provided correct placement of the preform on the discharge belt. The rolled preforms were transferred to an oven band and baked for about 8.5 minutes in a recirculating indirect gas-fired oven. The upper zones were maintained at a temperature of 330° F.±10° F. (165.5° C.±5.5° C.) and the bottom zones were maintained at a temperature of about 280° F.±5° F. (137.8° C.±2.8° C.). Upon baking, a roll type of flow dynamics was obtained resulting in cookies similar to a drop or rotary molded cookie without atypical thin crisp edges. The cookies had an average diameter of from about 2.0 to about 2.2 inches (5.1 to 5.6 cm.) and an average weight of from about 11.5 to about 12.0 grams. The rounded edges were uniform in color and an acceptable level and distribution of appearance of chocolate chips was obtained.

EXAMPLE 3

The hexagon-shaped cookie preforms of Example 2 were sprinkled with chocolate chips just prior to rolling. The preforms were rolled to substantially spherical shape using the orbiting cup device as previously described. The added chips penetrated into the outer dough layer. The rolled preforms were transferred to an over band and baked as in Example 2. The baking dynamics and resulting baked cookies were similar to those in Example 2 except that a higher level of chip visibility on the cookie surfaces was achieved.

EXAMPLE 4

| Ingredients | Percent by Weight |
|---|---|
| First Dough | |
| Hydrogenated vegetable shortening | 16.5 |
| Sugar | 30.4 |
| High fructose corn syrup | 4.5 |
| Molasses (26 ± 4% invert sugar) | 1.5 |
| Flour | 37.4 |
| Baking soda | 0.5 |
| Flavor and minor ingredients | 0.5 |
| Water | 8.6 |
| Second Dough | |
| Hydrogenated vegetable shortening | 15.5 |
| Sugar | 9.5 |
| High fructose corn syrup | 26.4 |
| Flour | 24.6 |
| Baking soda | 0.4 |
| Flavor and minor ingredients | 3.3 |
| Chocolate chips | 20.3 |

The two doughs were mixed as in Example 2. The doughs were then separately manually fed into the two distinct hoppers of a co-extrusion machine, Model No. DDP 200-9005, available from Bepex Hutt GmbH, Postfach 9, Daimlerstrasse 9, D-7105 Leingarten, West Germany. The dough was fed through the machine via feed rolls and extruded through a nozzle onto a conveyor belt. The extruder formed the doughs into continuous concentric cylinders such that the second dough was surrounded by an outer layer of the first dough. The dough cylinder was then cut into individual dough cookie preforms so that the outer dough layer was smeared across the inner dough which would have been exposed by the cutting process. The cookie preforms were pillow-shaped rectangular pieces with the second dough enrobed in a nonuniform layer of first dough. The preforms were then repositioned to provide proper alignment for rolling. The preforms were rolled to substantially hemispherical shape using an orbiting cup device as previously described. The second dough was substantially uniformly enrobed within an outer layer of first dough. An orbiting cup device having a platen of several cavity units, each having a hemispherical interior and hexagonal exterior, with a depth of 0.75 inch (1.9 cm.) rotating at about 105 rpm rolled several dough preforms simultaneously and smeared the top surface of the outer layer of dough to increase the visibility of or to expose the chocolate chips in the inner dough. Arresting the orbiting motion at a predetermined position provided correct placement of the preform on the discharge belt. The rolled preforms were transferred to an oven band and baked for about 8.5 minutes in a recirculating indirect gas-fired oven. The upper zones were maintained at a temperature of 330° F.±10° F. (165.5° C.±5.5° C.) and the bottom zones were maintained at a temperature of about 280° F.±5° F. (137.8° C.±2.8° C.). Upon baking, a roll type of flow dynamics was obtained resulting in cookies similar to a drop or rotary molded cookie without atypical thin crisp edges. The cookies had an average diameter of from about 2.0 to about 2.2 inches (5.1 to 5.6 cm.) and an average weight of from about 11.5 to about 12.0 grams. The rounded edges were uniform in color and an acceptable level of appearance and distribution of chocolate chips was obtained.

What is claimed is:

1. A process for making an improved crumb-continuous cookie having distributed therein discrete regions of storage-stable crisp texture and discrete regions of storage-stable chewy texture from a plurality of cookie doughs, comprising the steps of:
    (a) forming a laminate cookie preform from the doughs, wherein said dough providing a storage-stable chewy texture is within said dough providing a storage-stable crisp texture;
    (b) rolling the preform on a support means within a closed-top cavity of generally circular shape, said cavity moving about a predetermined axis of rotation, whereby said laminated dough preform is caused to rotate about the interior surfaces of said cavity, to substantially uniformly enrobe at least one dough within an outer layer of at least one distinct dough;
    (c) smearing the outer dough by the rolling step to permit some morsels contained in the enrobed dough to be partially exposed through the outer layer of dough; and
    (d) baking the rolled preform to yield a baked cookie.

2. A process according to claim 1 wherein the rolling step provides rolled preforms of substantially hemispherical to substantially spherical shape in proper alignment for baking.

3. A process according to claim 1 wherein said morsels comprise flavored chips, raisins, nuts, fruit bits, coconut, or cereal.

4. A process according to claim 3 wherein the rolling step causes the axis of each dough preform to precess and provides a random appearance of morsels in the baked cookie.

5. A process according to claim 1 wherein said morsels are sprinkled on the cookie preform prior to rolling and the rolling step causes the morsels to penetrate into the outer dough layer.

6. A process according to claim 1 wherein the cookie preforms are formed in step (a) by a process comprising the steps of:
    (a) forming a sheet of a first cookie dough;
    (b) depositing a second cookie dough on the first cookie dough;
    (c) placing a third cookie dough over the first dough and second dough; and
    (d) cutting discrete laminated cookies preforms from the doughs.

7. A process according to claim 6 wherein the first and third doughs are substantially identical.

8. A process according to claim 6 wherein the second dough is deposited on the first dough as a sheet.

9. A process according to claim 6 wherein the second dough is deposited on the first dough as individual discrete pieces or portions.

10. A process according to claim 9 wherein the first and third dough layers are cut around the individual discrete deposits of the second dough.

11. A process according to claim 10 wherein the preforms are cut in a geometric shape, such that no waste dough results.

12. A process according to claim 11 wherein the geometric shape is selected from the group consisting of circles, squares, rectangles, and hexagons.

13. A process according to claim 6 wherein the sheet of first cookie dough in step (a) is cut into discrete pieces prior to step (b), and the third cookie dough is placed over the pieces of first dough and second dough as a sheet.

14. A process according to claim 13 wherein the third cookie dough of step (c) is also cut into discrete pieces prior to step (c).

15. A process according to claim 6 wherein the third cookie dough is cut into discrete pieces prior to step (c), and the first cookie dough is in sheet form.

16. A process according to claim 6 wherein the rolling step generates an outer layer comprised of the first and third doughs with a smeared top surface around the enrobed individual deposits of second dough.

17. A process according to claim 6 wherein the rolling step causes the axis of each dough preform to precess and provides a random appearance of any morsels present in the baked cookie.

18. A process according to claim 1 wherein the cookie preforms are formed in step (a) by a process comprising the steps of:
    (a) co-extruding the doughs in a continuous manner; and
    (b) cutting the co-extruded doughs into laminated cookie preforms.

19. A process according to claim 18 wherein the doughs are extruded in the form of continuous concentric cylinders.

20. A process according to claim 18 wherein the laminated cookie preforms are formed by cutting the extruded dough into discrete pieces in a manner to substantially enrobe at least one dough within an outer layer of at least one distinct dough.

21. A process according to claim 20 wherein the rolling step generates a uniform outer layer of dough with a smeared top surface around at least one enrobed distinct dough.

22. A process according to claim 20 wherein the rolling step causes the axis of each dough preform to precess and provides a random appearance of any morsels present in the baked cookie.

23. A process according to claim 1 for preventing the formation of crisp thin edges on laminated cookies comprising:
(a) preparing laminated cookie dough preforms from a plurality of cookie doughs;
(b) rolling the laminated cookie preforms into substantially hemispherical to substantially spherical shape to essentially uniformly enrobe at least one dough within at least one distinct dough; and
(c) baking the rolled preforms to yield crumb-continuous baked cookies having distributed therein discrete regions of storage-stable crisp texture and discrete regions of storage-stable chewy texture.

24. A process according to claim 23 wherein the rolling is accomplished by one or more orbiting cups or cavities which cause the dough laminated preform to roll against the interior surface to reshape it to a substantially hemispherical to substantially spherical shape.

25. A process according to claim 24 wherein the rolling causes the axis of each dough preform to precess and provides a random appearance in the baked cookie of any morsels present.

26. A process according to claim 25 wherein the morsels comprise flavored chips, raisins, nuts, fruit bits, coconut, cereal, or other similar edible pieces.

27. A process according to claim 26 wherein the top surface of the outer dough is smeared by the rolling step to permit some morsels contained in the enrobed inner dough to be partially exposed through the outer layer of dough.

28. A process according to claim 24 wherein morsels are sprinkled on the cookie preform prior to rolling and the rolling step causes the morsels to penetrate into the outer dough layer.

29. A process according to claim 1 for rolling dough wherein the appearance of morsels in baked cookies can be controlled comprising:
(a) enrobing at least one dough piece containing edible morsels within an essentially uniform outer layer of at least one distinct dough to form a dough preform;
(b) smearing slightly the top surface of the dough preform during rolling to permit some of the morsels in the enrobed dough to be partially exposed through the outer layer;
(c) causing the axis of each dough preform to precess during rolling to provide a random appearance of morsels; and
(d) baking the dough preform to yield crumb-continuous baked cookies having distributed therein discrete regions of storage-stable crisp texture and discrete regions of storage-stable chewy texture.

30. A process according to claim 29 wherein the outer dough layer is comprised of a plurality of doughs.

31. A process according to claim 29 wherein the morsels are flavored chips, raisins, nuts, fruit bits, coconut, cereal, or other similar pieces.

32. A process according to claim 29 wherein morsels are sprinkled on the cookie preform prior to rolling and the rolling causes the morsels to penetrate into the outer dough layer.

* * * * *